United States Patent [19]

Maruoka

[11] 4,186,601
[45] Feb. 5, 1980

[54] MASS FLOW MEASURING APPARATUS

[75] Inventor: Hiroyuki Maruoka, Yokohama, Japan

[73] Assignee: Nissan Motor Company, Limited, Japan

[21] Appl. No.: 956,631

[22] Filed: Nov. 1, 1978

Related U.S. Application Data

[62] Division of Ser. No. 852,331, Nov. 17, 1977, abandoned.

[51] Int. Cl.² ............................................... G01F 1/70
[52] U.S. Cl. ................................................. 73/194 F
[58] Field of Search ........................... 73/194 E, 194 F

[56] References Cited

U.S. PATENT DOCUMENTS

| 2,569,974 | 10/1951 | Campbell | 73/194 |
| 2,632,326 | 3/1953 | Stuart | 73/194 |

Primary Examiner—Herbert Goldstein
Attorney, Agent, or Firm—Lowe, King, Price & Becker

[57] ABSTRACT

Mass flow measuring apparatus includes an ionizing electrode and an ion collecting electrode located downstream from the ionizing electrode. The ions are allowed to migrate at the same speed with the mass fluid flow and are collected by the collecting electrode. The transit time of the ions over the distance between a predetermined point of the path of fluid and the collecting electrode is measured.

5 Claims, 10 Drawing Figures

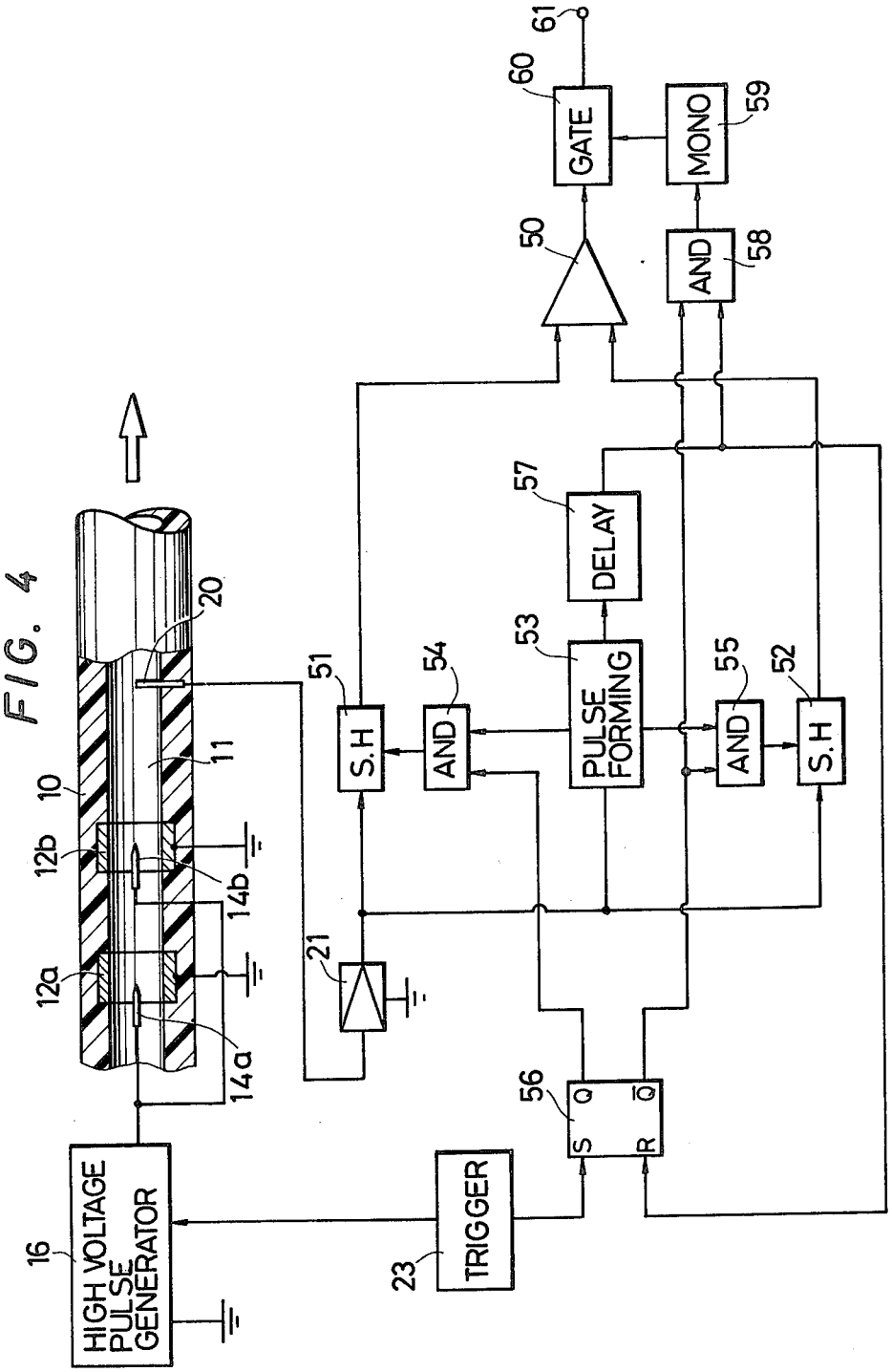

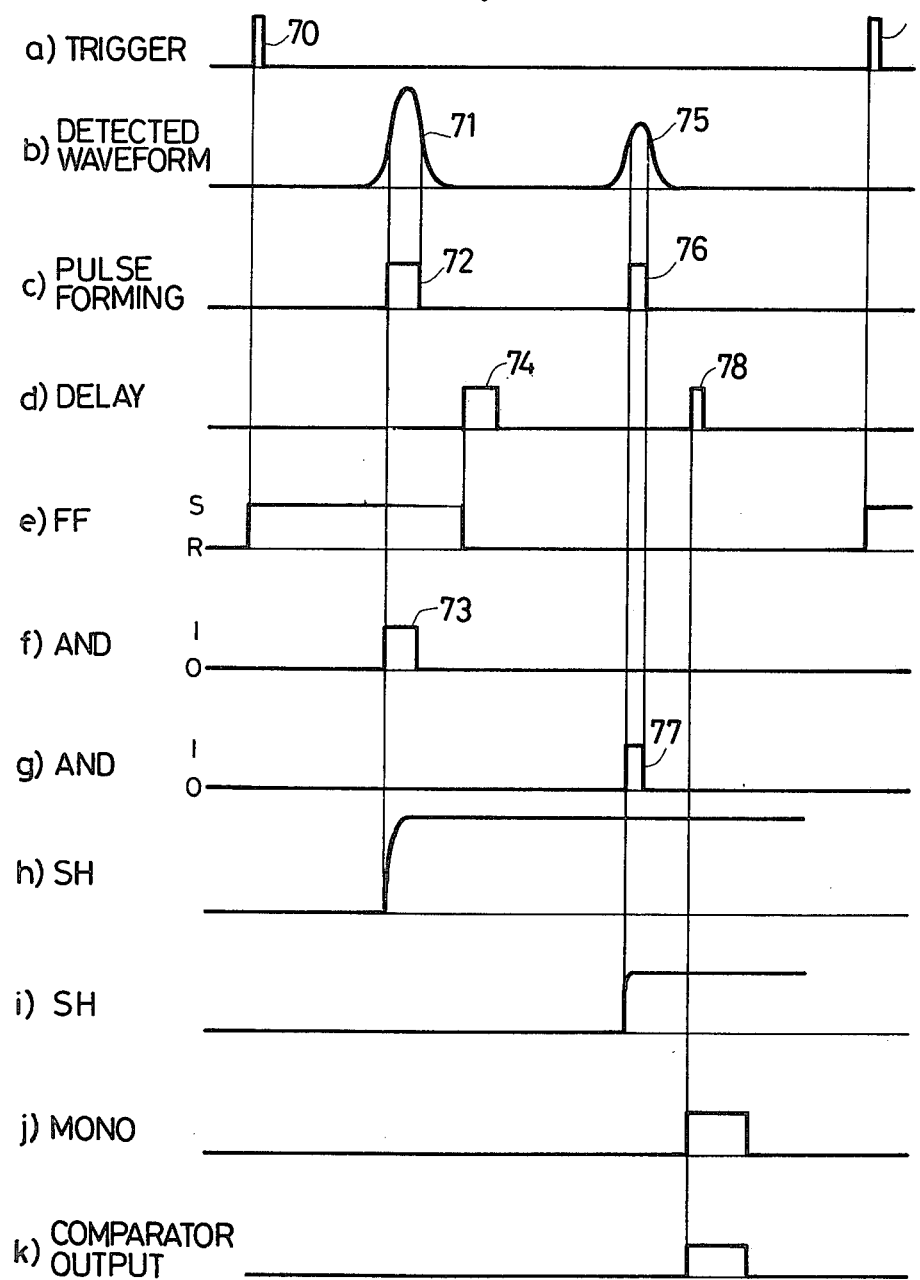

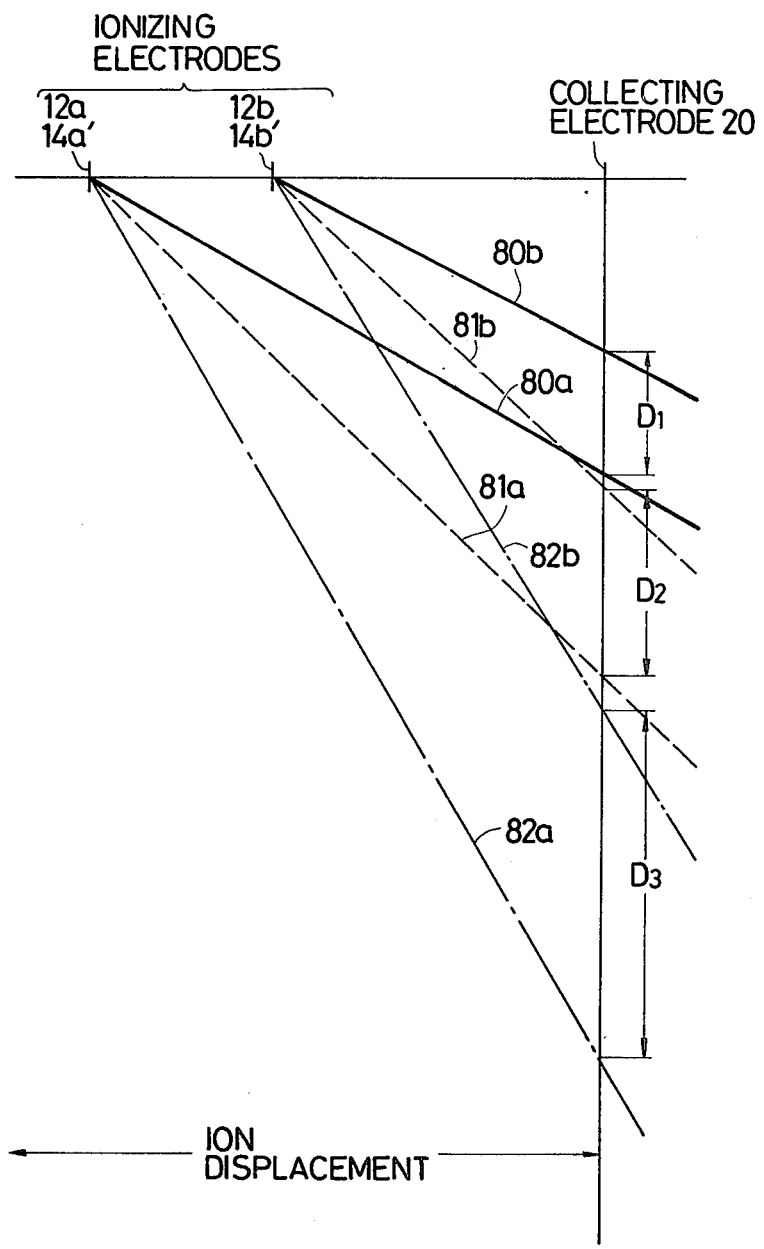

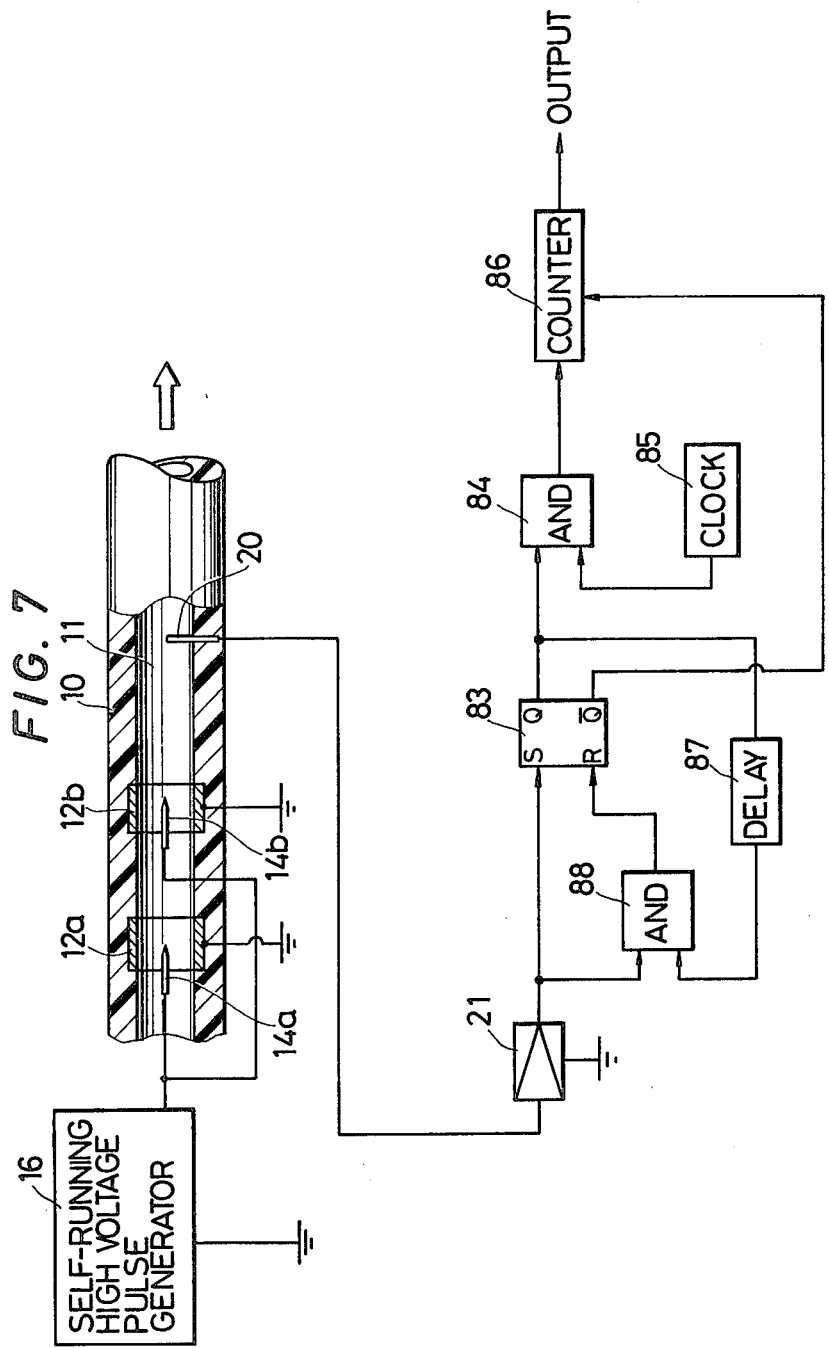

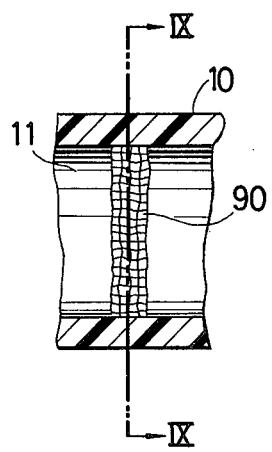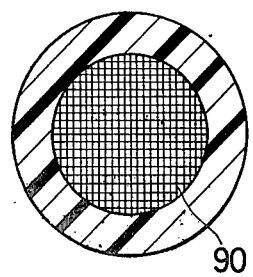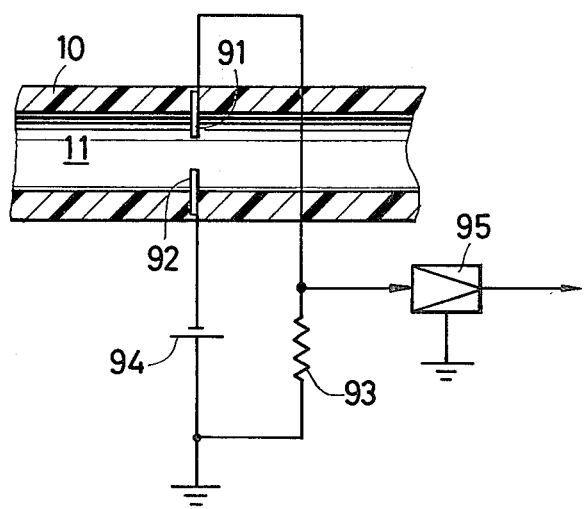

4,186,601

MASS FLOW MEASURING APPARATUS

This is a division, of application Ser. No. 852,331, filed Nov. 17, 1977 now abandoned.

FIELD OF THE INVENTION

The present invention relates to mass flow measuring apparatus which measure the drift of ionized fluid mass and more particularly to a mass flow measuring apparatus which measures the transit time of an ionized fluid mass migrating with the surrounding fluid mass over a predetermined distance between two points in the path of fluid flow.

BACKGROUND OF THE INVENTION

The reduction of noxious exhaust emissions from an internal combustion engine is achieved when the fuel supply is controlled by a feedback control signal derived from an exhaust gas sensor. In designing such feedback control system accurate measurement of fuel quantity supplied to the engine is required. Specifically, the mass flow measuring device must be capable of responding to the instantaneous variation of fluid flow. Conventional mass flow meters are not satisfactory for such purposes.

U.S. Pat. No. 3,470,741 discloses a mass flow meter which includes an ionizing means disposed in the path of fluid flow and a pair of opposed ion collecting electrodes spaced from the ionizing means transversely of the direction of fluid flow. With no fluid flow the ions would travel a median point of the collecting electrode. In the presence of fluid flow, the ions would displace from the median point and there is a difference between the charges collected by the respective electrodes, which difference is detected by a comparator.

SUMMARY OF THE INVENTION

The present invention contemplates to utilize the longitudinal migration of ions produced in the path of fluid flow at the same speed with the fluid stream. The migration of the ions over a predetermined distance between a first point and a second point displaced downstream from the first point is detected to measure the transit time of the ions over that known distance. Because of the longitudinal displacement of ions that is utilized, the mass flow meter of the invention is particularly suitable for high rate flow measurement and is capable of responding to rapid variations of the flow rate.

Therefore, the primary object of the invention is to provide a mass flow measuring apparatus whose responsiveness to mass flow rate variations is greatly improved.

BRIEF DESCRIPTION OF THE DRAWINGS

The advantages and features of the present invention will be understood from the following detailed description of the preferred embodiment with reference to the accompanying drawings, in which:

FIG. 4 is a second embodiment of the invention;

FIG. 5 is a waveform diagram useful for describing the operation of FIG. 4;

FIG. 6 shows graphically the drift of ions in a flow stream and is a plot of charge density vs. ion displacement.

FIG. 7 is a third embodiment of the invention;

FIG. 8 is an example of ion collecting electrodes employed in the various embodiments of the invention;

FIG. 9 is a cross-sectional view taken along the lines 9—9 of FIG. 8; and

FIG. 10 is a circuit arrangement for measuring the variation of electrical conductivity of the mass flow of fluid as a means for detecting the presence or magnitude of the ions migrating with the fluid flow.

DESCRIPTION OF THE PREFERRED EMBODIMENTS

Figure 1:
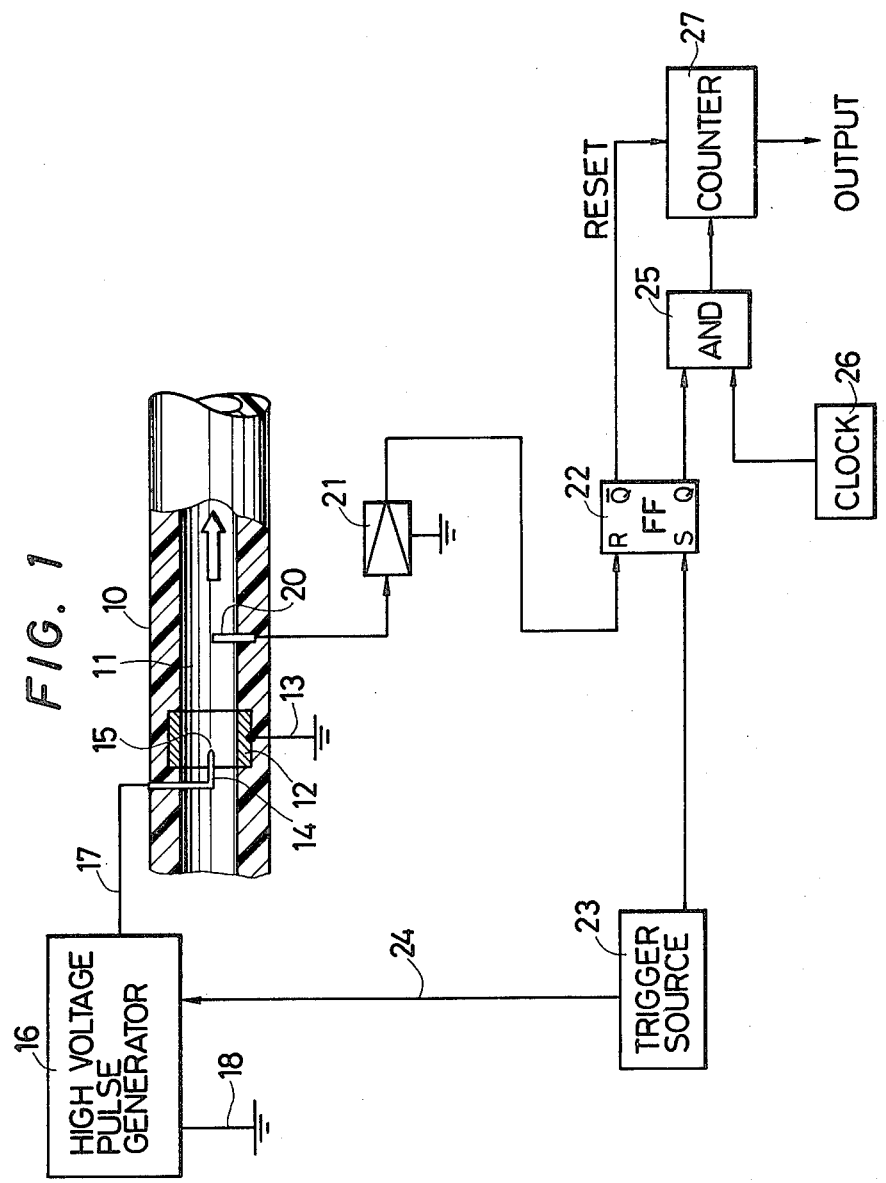
FIG. 1 is a first embodiment of the present invention.

A mass flow apparatus of a first embodiment is shown in FIG. 1 in which fluid is directed to pass through a passage 11 of a hollow cylindrical structure or pipe 10 which is constructed of an electrically nonconductive material. Ionizing means are provided which is formed by two electrodes: a ring or cylindrically hollow outer electrode 12 and a cylindrical rod or inner electrode 14 having a reduced diameter portion 15. The ring electrode 12 is embedded into the inner wall of the conduit 10 and connected electrically to a first terminal of a high voltage pulse generator 16 or ground by conductors 13 and 18. The cylindrical rod 14 is disposed concentrically with the center axis of the ring electrode 12 and connected electrically to the second terminal or output of the pulse generator 16 by conductor 17. An ion collecting electrode 20 is mounted in the cylindrical structure 10 downstream from the ionizing electrodes 12, 14 and connected electrically to a sense amplifier 21 whose output is connected to the reset terminal of a flip-flop 22. This flip-flop is triggered into a set condition by a signal from a trigger source 23 which also supplies the trigger signal to the pulse generator 16 through conductor 24. The trigger source 23 generates the trigger pulse at regular intervals to provide measurement of the instantaneous value of flow rate in succession.

An AND gate 25 is connected to the Q output of the flip-flop 22 to pass clock pulses from clock source 26 to a binary counter 27 which is reset by the $\overline{Q}$ output of flip-flop 22. The counter 27 provides digital output representing the transit time of the flow in the passage 11 over the distance between the ionizing electrode 15 and the collecting electrode 10. This digital output is applied to a flow rate indicating circuit (not shown) where the input signal is used to arithmetrically divide the known distance between electrodes 15 and 20 to compute an instantaneous value of the flow rate.

The amplitude of the pulse from the pulse generator 16 and the shape and size of the inner electrode 14 are so determined as to establish a corona discharge in the fluid passage 11 so that a portion of the fluid is ionized to produce a cloud of oppositely charged ions. The pulse from generator 16 is of negative polarity because it is found to be advantageous for effecting ionization of the fluid such as gasoline or the like, as compared with the use of positive polarity pulses. As a result, the positively charged ions are rapidly attracted by the negatively biased inner electrode 14, while the negatively charged ions migrate in the form of a space charge or cloud of ions with the fluid flow down the passage 11 at the same speed until they are collected by the collecting electrode 20, which is sensed by the amplifier 21. On the other hand, the flip-flop 22 is switched to a first binary state in response to the trigger pulse and AND gate 25 is thus enabled to pass clock pulses to the binary counter 27. Upon the detection of the negatively charged ions by the collecting electrode 20, the flip-flop 22 is switched to a second binary state to reset the counter 27.

It is understood therefore that in response to each of the trigger pulses from the trigger source 23, a cloud of negatively charged ions is produced in the passage 11 and migrates at the same speed as the speed of fluid flow in the passage 11 from the point defined by the ionizing electrode 14 to the point defined by the collecting electrode 20. During the migration of the cloud of ions the counter 27 is activated to produce an output representative of the transmit time of the ions over the known distance between the two defined points. Since the cloud of ions migrates at the same speed as the fluid flow, the digital output from the counter 27 is a measure of the instantaneous value of the mass flow rate.

Figure 2:
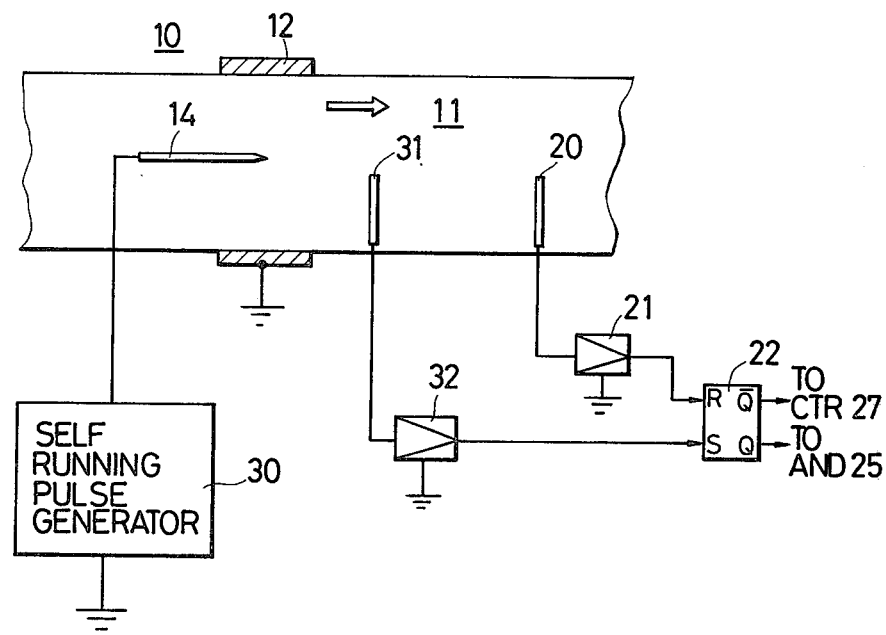
FIG. 2 is an alternative embodiment of the invention in which an additional collecting electrode is employed as a means for triggering the time measuring circuit of FIG. 1.

Various modifications are possible. In FIG. 2, an alternative embodiment of the invention is shown which is similar to the previous embodiment with the exception that a self-running high-voltage pulse generator 30 is employed instead of the externally triggered pulse generator 16 and that an additional collecting electrode 31 is provided downstream from the ionizing electrode 14 and upstream from the collecting electrode 20. A cloud of negatively charged ions that migrate with the fluid flow is partially collected by the electrode 31 and sensed by an amplifier 32 to trigger the flip-flop 22 into a set condition and then collected by the electrode 20. Therefore, the digital output from the counter 27 represents the transmit time the fluid takes to travel over the distance between collecting electrodes 31 and 20 rather than it takes to move between the electrodes 14 and 20.

Figure 3:
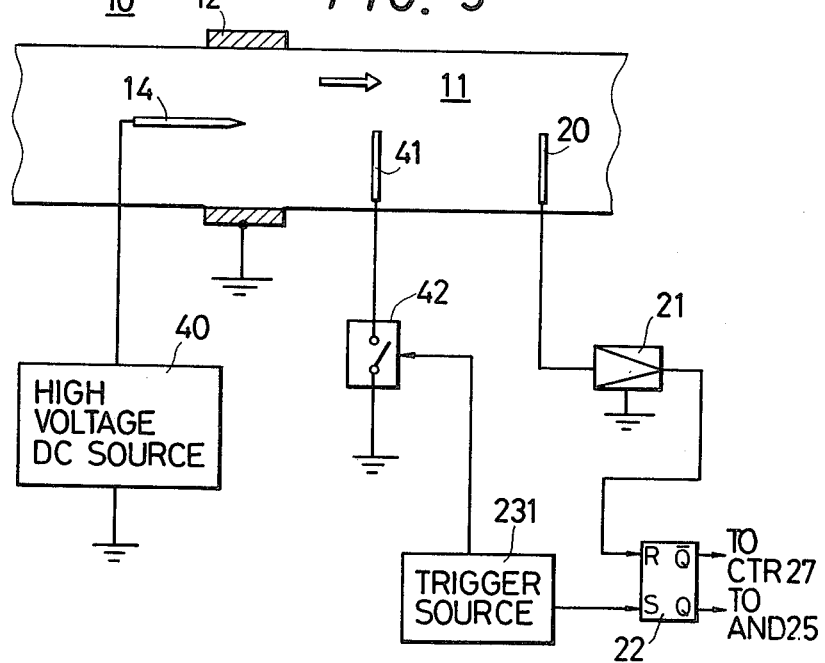
FIG. 3 is an alternative embodiment of the invention in which a portion of a continuous stream of ions is deionized to produce an electrically neutralized fluid mass.

In a modification shown in FIG. 3, a high voltage DC power supply 40 is used instead of pulse generators used in the previous embodiments in order to establish a continuous flow of negatively charged ions in the passage 11. An additional collecting electrode 41 is disposed downstream of the ionizing electrode 12. The electrode 41 is connected by means of an electronic switch 42 to ground in response to a control signal supplied from a trigger source 231. This trigger source also supplies the trigger signal to the set input terminal of the flip-flop 22. The collecting electrode 20 is disposed downstream from the collecting electrode 41 as in the embodiment of FIG. 2. When the collecting electrode 41 is grounded in response to the trigger signal, the negatively charged ions are collected by the electrode 41 to deionize a portion of the continuous ion stream to form an electrically neutralized region which migrates with the fluid flow. The potential at the second collecting electrode 20 which is initially at a negative level is raised to zero voltage level as it is impinged by the electrical neutral region. This potential variation is sensed by the amplifier 21 whose output is supplied to the reset input terminal of the flip-flop 22. It is therefore to be understood that the electrical neutral region in a continuous stream of ions can be considered as an equivalent to a cloud of ions in an electrical neutral fluid stream in so far as such region is electrically distinguishable from the surrounding mass of fluid.

FIG. 4 illustrates another embodiment of the present invention in which the same numerals are used to designate those identical with those of FIG. 1. The cylindrical structure 10 is provided with two identical ionizing means: the first ionizing means is formed by an outer or cylindrical hollow electrode 12a and an inner or cylindrical rod electrode 14a and the second ionizing means is formed by an outer electrode 12b and an inner electrode 14b. The outer electrodes 12a and 12b are connected to the first terminal of the high voltage pulse generator 16 or ground and the inner electrodes 14a and 14b are connected together to the second terminal of the pulse generator 16. With this arrangement a first and a second cloud of ions are formed at axially spaced locations in the passage 11. Downstream from the second ionizing electrode 12b is located the collecting electrode 20 which is connected through the sense amplifier 21 to the input of a first sample-and-hold circuit 51 whose output is connected to a first terminal of a comparator or differential amplifier 50 and to the input of a second sample-and-hold circuit 52 whose output is connected to the second terminal of the differential amplifier 50. A pulse forming circuit 53 is connected to the output of the sense amplifier 21 to shape the waveform of the amplifier output into a rectangular pulse, which pulse is applied by way of an AND gate 54 to the sampling gate terminal of the sample-and-hold circuit 51 on the one hand, and on the other hand, by way of an AND gate 55 to the sampling gate terminal of the sample-and-hold circuit 52. The AND gates 54 and 55 are respectively enabled by the Q and $\bar{Q}$ outputs from a flip-flop 56 which is triggered into the set condition by an output from the trigger source 23 and into the reset condition by an output from a delay circuit 57 which is connected to the output of the pulse forming circuit 53. An AND gate 58 is provided to generate a trigger signal for a monostable multivibrator 59 in response to the output from the delay circuit 57 when the flip-flop 56 is in the reset condition. The output of the comparator 50 is passed through a transmission gate 60 in response to the output from the monostable 59 to an output terminal 61.

The operation of the embodiment of FIG. 4 will be better understood with reference to FIG. 5. In response to a trigger pulse 70 from the trigger source 23 (FIG. 5a) a negative polarity high voltage pulse is supplied from the pulse generator 16 to the inner electrodes 14a, 14b to negatively bias them with respect to the outer electrodes 12a, 12b. Simultaneously, the flip-flop 56 is triggered into a set condition (FIG. 5e) to enable AND gate 54. A series of clouds of negatively charged ions is formed in the path of the fluid flow. Because of the tendency of the same polarity ions to repel from each other, the density of the respective ion clouds will decrease with time as the ions migrate toward the collecting electrode. Since there is a difference in distances travelled by the ion clouds to the collecting electrode 20, the density of the downstream side ion cloud is lower than that of the upstream side ion cloud when they reach the collecting electrode 20, as shown in FIG. 5b. Since the charge density decreases at different rates depending upon the flow rate of the ion cloud in the passage 11, the difference in potentials detected in response to the respective clouds of ions by the collecting electrode 20 varies with flow rates. As clearly shown in FIG. 6, at a given flow rate the charge density of the respective ion clouds will decrease at the same rate as indicated by the solid lines 80a and 80b so that the potential difference at the collecting electrode 20 will be represented by a voltage $D_1$. With a decrease in flow rate, the charge density will decrease as indicated by broken lines 81a and 81b, thus producing a potential difference $D_2$ which is greater than $D_1$. A further decrease in flow rate will cause the charge density to decrease further as indicated by dot-dash lines 82a and 82b, providing a potential difference $D_3$ which is greater than $D_2$. Therefore, the potential difference can be used to measure the mass flow of fluid.

When the preceding cloud of ions reaches the collecting electrode 20, a waveform 70 will be detected and in response thereto a rectangular pulse 72 is generated from the pulse forming circuit 53, which pulse has a duration corresponding to the time when the waveform is in excess of a predetermined threshold level. The output from the pulse forming circuit 53 activates the AND gate 54 to provide a sampling pulse 74 to the sample-and-hold circuit 51. The maximum amplitude of the detected waveform 71 is thus registered in the sample-and-hold 51 as shown in FIG. 5h and fed into the first terminal of the comparator 50. On the other hand, the pulse 72 from the pulse forming circuit 53 is delayed for an interval by means of the delay circuit 57 to provide a pulse 74 to reset the flip-flop 56 (FIGS. 5e and 5f). Upon the resetting of the flip-flop 56, the AND gates 55 and 58 are enabled.

As the following cloud of ions reaches the collecting electrode 20, a waveform 75 will be generated to cause the pulse forming circuit 53 to produce a pulse 76 which activates the AND gate 55 to produce a sampling pulse 77 (FIG. 5g). The sample-and-hold circuit 52 thus registers the maximum amplitude of the detected waveform 75 as shown in FIG. 5i and feeds its stored voltage signal to the second terminal of the comparator 50 for comparison with the previously applied voltage signal from sample-and-hold 51. The pulse 76 from the pulse forming circuit 53 is delayed by the delay circuit 57 to provide a pulse 78 (FIG. 5d) which is coupled to the AND gate 58, thus causing it to provide a trigger pulse for the monostable 59. The monostable 59 in turn produces a gate control pulse of a duration sufficient to allow a computing unit (not shown) to process the input signal applied thereto.

The comparator 50 computes the difference between the voltages applied thereto to represent a measure of the transit time of the ion clouds and passes its output through the transmission gate 60 when gated on by the output from the monostable 59 to the output terminal 61.

A further embodiment of the present invention is illustrated in FIG. 7 in which the same numerals are used to indicate those identical to those shown in FIG. 4. The pulse generator 16 in this embodiment is of a self-running type which biases the first and second ionizing electrodes 12a, 14a and 12a, 14b with negative pulses at regular intervals. In response to a single applied pulse, a series of first and second clouds of negatively charged ions is produced in succession along the passage 11 and migrate toward the collecting electrode 20. The sense amplifier 21 generates a first output in response to the collection of the first cloud of ions generated from the ionizing electrodes 12b, 14b and a second output in response to the collection of the second cloud generated from the ionizing electrodes 12a, 14b. In response to the first output from the sense amplifier 21, a flip-flop 83 is triggered into a set condition which enables an AND gate 84 to pass clock pulses from a clock source 85 to a binary counter 86. The Q output of the flip-flop 83 is applied through a delay circuit 87 to an AND gate 88. When the second output is generated from the sense amplifier 21, the AND gate 88 applies a rest pulse to the flip-flop 83 which in turn resets the counter 86. The digital output from the counter 86 thus represents the length of time from the instant the first cloud of ions impinges on the collecting electrode 20 to the instant when the second cloud of ions impinges on the same collecting electrode. Since the impingement of the upstream side cloud of ions is delayed in proportion to the mass flow rate, the output of the counter 86 is a measure of the mass flow rate.

The collecting electrode 20 shown and described in the previous embodiments may be formed into a rod or a plate-like member. However, it is preferable to employ a mesh electrode 90 as shown in FIGS. 8 and 9 to increase the ion collecting efficiency. The mesh electrode 90 is formed of a multi-layered disc-like mesh structure disposed transversely of the passage 11. This structure increases the surface areas of the collecting electrode while permitting the fluid to pass therethrough.

Another method of detecting ions is illustrated in FIG. 10 in which a pair of electrodes 91 and 92 is disposed in opposed relation to each other and electrically connected in a series closed loop including a resistor 93 and a DC voltage source 94 whose one terminal is connected to ground. Since the fluid to be measured is of nonconducting material, there is no current flow when the fluid is not ionized. When a cloud of ions is passed through the electrodes 91 and 92, there is a reduction in resistance between them, and the resulting current will develop a voltage across the resistor 93, which voltage is sensed by an amplifier 95.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. Apparatus for measuring the mass flow of fluids passing through a conduit comprising:
   means for charging a stream of said fluid at a first potential;
   a first electrode disposed downstream of said charging means;
   a source of generating trigger pulses at periodic intervals;
   a gate-controlled switch for applying a second potential to said first electrode to discharge a portion of the stream of said charged fluid in response to each of said trigger pulses;
   a second electrode disposed downstream of said first electrode to detect each of said discharged portions to generate an output signal;
   a bistable device for assuming a first binary state in response to said trigger pulses and a second binary stage in response to the output signals from said second electrode; and
   means connected to said bistable device for measuring the lengths of time between said first and second binary states.

2. Apparatus as claimed in claim 1, wherein said charging means comprises a source of DC potential, an electrode encircling a portion of said conduit and connected to one terminal of said potential source and a needle electrode aligned to the center of said encircling electrode in said fluid.

3. Apparatus as claimed in claim 2, wherein each of said first and second electrodes comprises a meshed structure.

4. Apparatus for measuring the mass flow of fluids passing therethrough comprising:

means for ionizing the fluid to generate a series of first and second electrically distinguishable fluid masses from the surrounding mass of fluid respectively at a first and a second predetermined point, wherein the second predetermined point is located downstream from the first predetermined point, said first and second electrically distinguishable fluid masses migrating with the surrounding fluid toward a third predetermined point located downstream from said second predetermined point;

means for detecting the presence of said first and second migrating regions at said third predetermined point; and means for determining the length of time from the instant when said first electrically distinguishable region is detected to the instant when said second electrically distinguishable region is detected.

5. Apparatus for measuring the mass flow of fluids passing therethrough comprising:

ionizing means for generating a series of first and second clouds of ions in the path of fluid flow respectively at a first and a second predetermined point, wherein the second predetermined point is located downstream from the first predetermined point, said first and second clouds of ions migrating with the fluid flow toward a third predetermined point located downstream from said second predetermined point and tending to decrease their charge density with the distance travelled from said first predetermined point;

means for detecting the charge density of said first and second clouds of ions at said third predetermined point; and means for detecting the difference between the detected charge density of the first cloud of ions and the detected charge density of the second cloud of ions.

* * * * *